Figure 1:
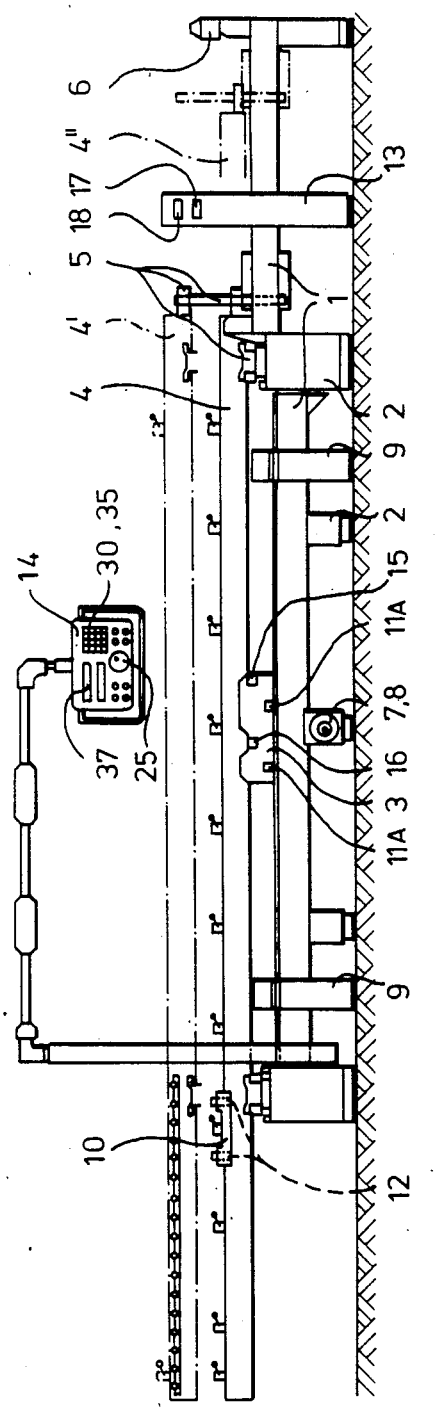

United States Patent [19]

Schneider et al.

[11] Patent Number: 4,682,280
[45] Date of Patent: Jul. 21, 1987

[54] SIMULATION ARRANGEMENT FOR DETERMINING DESIRED VALUES FOR THE TRANSPORT OF WORKPIECES OF A MULTISTAGE PRESS

[75] Inventors: Franz Schneider; Helmut Braitinger; Otto Feinauer, all of Göppingen, Fed. Rep. of Germany

[73] Assignee: L. Schuler GmbH, Fed. Rep. of Germany

[21] Appl. No.: 768,478

[22] PCT Filed: Dec. 19, 1984

[86] PCT No.: PCT/DE84/00277
§ 371 Date: Aug. 22, 1985
§ 102(e) Date: Aug. 22, 1985

[87] PCT Pub. No.: WO85/02921
PCT Pub. Date: Jul. 4, 1985

[30] Foreign Application Priority Data

Dec. 24, 1983 [EP] European Pat. Off. ........ 83113091.9

[51] Int. Cl.[4] ...................... G05B 19/42; G06F 15/46
[52] U.S. Cl. .................................... 364/191; 364/149; 364/476; 364/478
[58] Field of Search .............................. 364/148–151, 364/191–194, 468–469, 474, 476, 478, 200 MS File, 900 MS File, 300 MS File, 513, 578; 318/568–569

[56] References Cited

U.S. PATENT DOCUMENTS

| | | | |
|---|---|---|---|
| 3,668,498 | 6/1972 | Austin, Jr. ........................... | 318/568 |
| 3,878,983 | 4/1975 | Hamill, III et al. ............. | 235/151.11 |
| 3,975,835 | 8/1976 | Reichman ....................... | 364/802 X |
| 4,208,675 | 6/1980 | Bajon et al. ......................... | 358/93 |
| 4,338,672 | 7/1982 | Perzley et al. ...................... | 364/513 |
| 4,347,578 | 8/1982 | Inaba .................................. | 364/513 |
| 4,373,185 | 2/1983 | Mills et al. ......................... | 364/478 |
| 4,512,747 | 4/1985 | Hitchens et al. ................. | 364/478 X |

Primary Examiner—Gary V. Harkcom
Attorney, Agent, or Firm—Barnes & Thornburg

[57] ABSTRACT

An arrangement that is independent of a press for physically simulating the actual movements of transfer rails of a multi-stage press and for reducing periods of stoppage of multi-stage presses during the tool change and the connected setting up of tools, of gripping devices and of the movements of the transfer rails. The arrangement includes a program control for the sequences of movements employing values optimally adjusted at the arrangement, for the adjusting measurements, the acceleration and speed values of the transfer rails, for the tool automation and the active gripper operation which are scanned using program-technology and are processed into a cycle of movements that can be transmitted to the multi-stage press.

8 Claims, 2 Drawing Figures

SIMULATION ARRANGEMENT FOR DETERMINING DESIRED VALUES FOR THE TRANSPORT OF WORKPIECES OF A MULTISTAGE PRESS

This invention relates to simulation arrangement for determining desired values for the transport of workpieces and the dependent adjusting quantities, such as the gripper movement and the tool automation, of a multistage press.

Multistage presses are used for the forming of sheet-metal strips or sheet-metal blanks to obtain preforms using a plurality of tools. The transport of the sheet to the first machining stage, the transport of workpieces between the machining stages and possibly the delivery of the workpieces by the press takes place by means of press-driven transfer rails or, in the case of an external drive, by means of transfer rails whose movements will then be controlled by the press. The transfer rails carry gripping tools that are adapted to the dimensions of the workpiece of which at least the gripping tool or the pair of gripping tools for the transport from the preliminary stage, the centering stage or similar stage in a controllable manner is developed to have an active effect.

When adjusting the multistage press for another workpiece, the tools and gripping devices must be exchanged. The adjustment of tools and gripping devices, the adapting of gripping devices in the case of workpieces that were newly included in the manufacturing program as well as the adjustments of the transport movements of the transfer rails in general that depend on the tool change and must be carried out again in each case, with respect to kinetic quantities and extent of movement, to speed and acceleration, are very time-consuming and connected with a correspondingly long period of stoppage of the multistage press. Because of the very high procurement costs, the cost effectiveness of multistage presses in particular is based on a high yield rate, i.e., a high degree of utilization.

In order to decrease periods of stoppage it is known to set up the tools on tables that can be moved out of the operating range of the press. However, this does not make it possible to shorten the time periods for setting up the gripping devices and of the workpiece-specific transfer movements. These activities must still be carried out at the press at creep speed. Since, however, these setting-up times make up the largest part of the overall setting-up period, long periods of stoppage of the multistage press will still occur. In addition, there will frequently be, during the trial run, crash situations as a result of errors during assembly and setting-up as well as inattentiveness of the operator which may lead to damage to the tool, the transfer arrangement and the press structure. Also, multiple repetitions of the movements to be adjusted for optimizing the movement quantities of the transfer and of the gripper dimensions and gripper arrangements increase the period of stoppage of the multistage press. During the adjustment, all press stages run in a manner such that access to the tool is limited only with respect to time and the depositing process as well as the removal process in the lower part of the tool can be controlled only to a limited extent.

From DE-OS 24 50 477 it is known to let an additional feeding device engage at the transfer rails, said feeding device taking over the feeding drive of the press which then has to be disconnected. As a result the accessibility to the working area is made possible during the adjustment of the transfer and of the gripping devices. But all adjustments must be made while the press is stopped, and the test runs must be carried out in the press during a time when all driving means are required to be running.

In DE-OS 25 30 261 an arrangement for the painting of parts of a car body is described. This arrangement has an automatic device having a paint spray gun which must be moved manually at a distance from a model while it applies paint to this model covering the surfaces via the contours. The movements and the quantities of paint used during these movements are determined via emitters and are processed in a program for the treatment of duplicate pieces. For this purpose, the arrangement also has a second paint spraying device which utilizes the processed values and comprises essentially a mechanical structural component with the supporting functions for a paint spray gun, a hydraulic structural component for the adjusting possibilities of the mechanical structural component, and an electrical data processing facility which repeatedly, according to a stored program, causes the work sequences to be carried out that are required for the application of paint. The desired values resulting from moving of the arrangement along the contour of the model may be corrected by repeatedly moving over the model with the arrangement. This arrangement contemplates preventing the operator from setting up and operating the paint spraying device in the area where the duplicate parts are to be painted. The paint spraying device follows the movements of the manually guided paint spray gun into each freely selectable position and without directions that are indicated by axes.

Originating as an improvement upon the arrangement according to DE-OS 24 50 477, applicants' invention has as an object a simulation arrangement wherein the desired values for the workpiece transfer are determined in a multistage press independently of the press, wherein adjustment within minimum and maximum values for optimizing the sequence of the transfer and of the points in time of the start of the tool automation and of the gripper activities, taking into account tool-specific and press-specific requirements is effected, and wherein processed data values determined from the aforedescribed operations are to determine values which are input into the multistage press in a manner which minimizes press down-time in order to maximize press utilization.

According to the invention, this object is achieved by means for simulating the transport movements that can be carried out by the press, such as driving means, braking means, movement-deflecting means, guiding means and movable transfer rails carrying gripping devices in a separate frame construction, with means for tool automation, for the control of the grippers and for the control of the workpiece transport, by using a program control with a variable program for the moving sequences.

Another object of the invention is the provision of a multi-stage press physically simulation arrangement for determining desired values for the transport of a workpiece the position of which is controlled by at least one of gripper movement and tool automation comprising means separate from said multi-stage press for simulating the movement of at least one transport of said multi-stage press, the transport comprising at least one of driving means, braking means, movement changing means, gripping device guiding means with movable transfer rails therefor carrying said gripper devices and a program control means with a variable program for the sequences of movement responsive to and for controlling at least one of a means for tool automation, a means for gripper control and a means for control of a workpiece transport.

Another object of the invention is the provision of a simulation arrangement wherein the program control means comprises a positioning control means with workpiece-specific and press-surroundings-specific programming.

Another object of the invention is the provision of a simulation arrangement wherein a program control means comprises a CNC programmable with respect to at least a workpiece and responsive to signals received from at least one of an input keyboard and a display unit, a stored-programmable control means connected to the CNC and responsive to signals received from at least one of a tool automation means, gripper movement control means and a workpiece transport control means for control of the CNC, of said tool automation means, of said gripper movement control means, of said workpiece transport control means and the control of a drive in at least two axes of workpiece transport wherein, for each of said axis, said simulation arrangement has a drive motor unit, a motor control circuit therfor and a value emitter sensing the actual position of said workpiece transport with respect to said axis.

Another object of the invention is the provision of a simulation arrangement comprising, for a programmable sequence of movements, input means for transmitting to the CNC signals representing th values for said programmable sequence of movements for the programming for movement on at least one of said axis, means for transmitting to said CNC sensed actual position values on said at least one of said axis, output means connected to the CNC for receiving output data from said CNC for at least said at least one axis to supply position-related signals to control position movement on said axis, and indicating means for the visual reproduction of the current actual values for position assumed on said axis.

Another object of the invention is the provision of a simulation arrangement comprising input means connected to the stored program control means for processing and control of the signals occurring in at least one of an input keyboard, a display unit, a tool automation means, gripper movement control means an workpiece transport control means, for the control of at least one of the CNC, at least one axis drive of the tool automation of the gripper movement means and of the workpiece transport control means.

Another object of the invention is the provision of a simulation arrangement comprising a first manually controllable desired-value input means connected to the CNC for generating signals representing identification of at least one individual axis and a second manually controllable desired-value input means connected to the CNC for generating signals representing minimum and maximum adjusting position data values for at least one of said axes, path measurement and acceleration and speed of movement on said at least one of said axes and a manually operating regulating means for moving the transfer rails on at least one of a number of axes.

Another object of the invention is the provision of a simulation arrangement wherein the first manually-controllable desired-value input comprises a keyboard having a group of keys for inputing the individual identification of axes and a group of key for inputing the minimum and maximum adjusting position data values, and wherein the CNC comprises output means for supplying desired values to control movement on at least one of said axes, and storage means for the storage of data to be supplied to the press.

Another object of the invention is the provision of a simulation arrangement wherein the means for simulating further comprises a motor with a speed which is comparable to the speed of the press and a pulse generator for generating signals representative of an angle-of-rotation-dependent commands to the driving means.

Another object of the invention is to provide a system wherein of the invention when one axis is called for the adjusting and optimizing of a movement, other drives or the means for the tool automation and the gripper operation are not forced to be activated.

Another object of the invention is to provide means for simulating the movements of the press designed only for a part of the tool set, i.e., for three out of six tools; and wherein the adjusted values for the length of path, the speed and the acceleration are transferrable for setting up of the remaining (in this case, three) tools and gripping devices. When setting up the tools, the grippers and the transport, space conditions, which would be an obstacle and have to be taken into account when setting-up at the multistage press, need not be considered so that easy accessibility is ensured to all adjusting ranges. The frame structure of the arrangement, in comparison to prior art multistage presses, has less mass and can therefore be adjusted locally. By means of the invention errors of transfer, of tool construction and similar errors can be picked up that is, identified, and taken into account. All movements of the transport, the tool automation and the gripper activities, via the stored-programmable control, can be picked up, i.e., identified, in order to establish an optimal cycle of movements.

Figure 2:
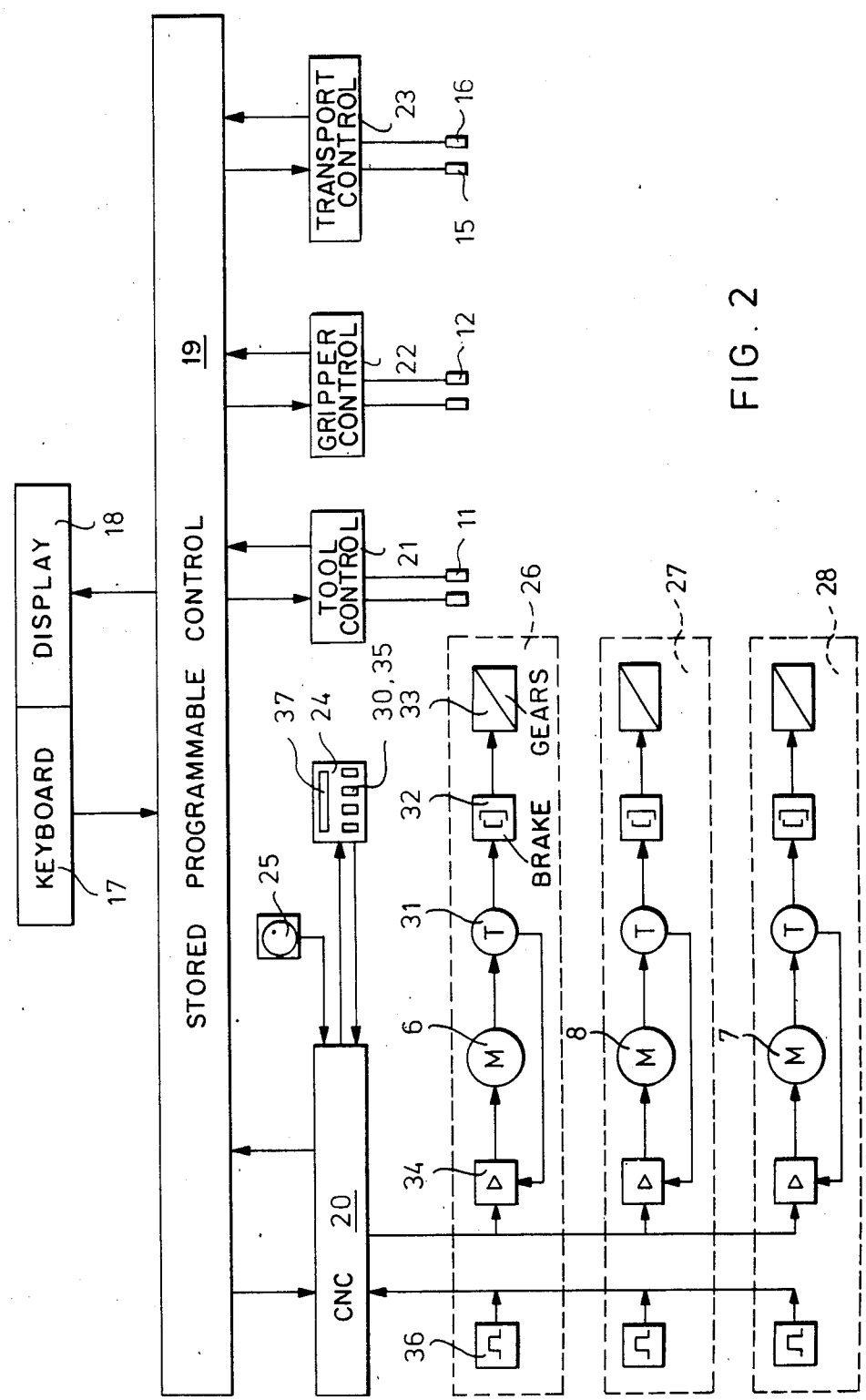

These and other objects, features, and advantages of the present invention will become more apparent from the following description when taken in connection with the accompanying drawings which show, for the purpose of illustration only, one embodiment in accordance with the present invention, and wherein:

FIG. 1 is a front view on the longitudinal position of a frame structure that is independent from the press; and FIG. 2 is the block diagram of the electric/electronic control of the arrangement according to FIG. 1.

Referring now to the drawings wherein like reference numerals are used to designate like parts and more particularly to FIG. 1, a frame structure of the simulation arrangement according to the invention includes a frame 1 which, via vertically adjustable and vibration-insulating levelling shoes 2 is set up on the floor, and may be fixed in the floor via foundation fastening elements. In the frame 1, the bottom parts of a part of the tool set are housed, and a bottom part 3 of a tool is shown in the drawing as an example. On both sides of the bottom parts of the tool and extending in longitudinal direction of the frame structure, two transfer rails 4 are arranged of which only the transfer rail that is located in front of the bottom parts of the tool can be recognized. In other positions that have the numbers 4' and 4'', the transfer rails are indicated by dash-dotted lines. Into these positions 4' and 4'', and in addition, into a workpiece-gripping position, that is not shown, and into which the gripping devices must be guided in guiding means 5 during the workpiece transfer, the transfer rails 4 are moved synchronously with respect to one another via a central drive which, via one selectively shiftable clutch per axis of movement, affects the transfer rails or, as shown, via a motor drive per axis. One gripping device 10 is shown. The gripping devices correspond to the active or passive gripping devices that are known from multistage presses. It is therefore possible to bring the gripping devices that are arranged at the transfer rails for determining the desired values without transfer rails into the multistage press. For required transfer movements in, for example, wherein three axes, wherein axes which are orthogonal with respect to one another are employed three motors are provided of which motor 6 is used for the longitudinal transport, motor 7 is used for the lifting and lowering, and a motor 8 located behind motor 7 is used for the opening-closing movement (the transverse movement) of the transfer rails 4. The transmission means of the driving movements of the transfer rails 4, such as the braking means 32, FIG. 2, the movement-deflecting means 33, FIG. 2, as well as the guiding means 5 for the transfer rails 4 are known from multistage presses and for reasons of clarity are not shown here in detail. Pressure units 9 are provided for the tool automation and the clamping and opening movements of the grippers. Control lines and control valves are also not shown since these means and their control-related arrangement will be constructed according to principles well known to those skilled in the art. The tool automation includes workpiece ejectors 11A which can be acted upon by the pressure units 9 via controllable valves. The shown workpiece ejectors 11A, in this case, are located within the respective bottom part 3 of the tool. For the clamping movement of the grippers, two working cylinders 12 are shown symbolically in the area of the gripping device 10 gripping a sheet-metal plate or a sheet-metal strip.

The moving cycle of the transfer rails 4 starts, for example, with the closing movement in the fully drawn-out position in a moving direction that is orthogonal with respect to the plane of the drawing in which the transfer rails move toward one another. In this closing position, the working cylinders 12 of the active gripping devices 10 are also operated. With the movement of the transfer rails 4 into position 4', the workpiece ejectors 11A are at the same time, acted upon by pressure from the pressure units 9. By means of the transfer movement, the workpieces are deposited in a first or bottom part of the tool in the position indicated by 4". The active gripping devices 10 open, the workpiece ejectors 11 have moved back or are moved back with the workpiece depositing. For the electrical control of the motors 6, 7, 8 and the control drive for the tool automation 11 and 21 and the gripper movement 12 and 22, the corresponding electrical and electronic data processing switching and control equipment is housed in a control cabinet 13 and a freely movable suspended control panel 14. For the monitoring of the correct depositing of workpieces and of the completed workpiece transport, for example, non-contact switches or sensors 15 and 16, are arranged in the bottom part areas of the tools.

The electronic control has an operating area, for example, a keyboard 17 for the input of operating signals, such as starting and stopping signals, and a visual display area 18 in which the current operational conditions of the simulation arrangement are made visible, for example, via displays, measuring instruments, indicator lamps and similar devices. The operating signals, via input components, are fed into a stored-programmable control 19, which is known from EP-PS 0 010 170 which corresponds to U.S. Pat. No. 4,314,354 and identified hereinafter as SPS. The signals for the signalling are emitted by the SPS 19 via output components. The SPS is used for the processing of all operational data, the switching-on and the release of the drives, the monitoring of the driving movements and also the blocking of the sequence of movements when disturbances occur or inadmissible operating data are exceeded. The processing takes place in bit patterns by means of the indicated program, in which case a program is serviced continuously. This program is variable and must be adapted to the respective situations that are indicated by new tools. In addition to the electronic input and output components, the SPS 19 has program and data modules (hardware of the SPS) for performing logical operations for the processing and making-available of data as a result of the data received from input components. Based on a fixed program sequence for the tool to be newly set up, addresses and information are scanned in the SPS 19, are processed with the available input information in internal registers, are stored and are made available at the output components. By means of the SPS 19, the data traffic with the tool automation 21, the gripper clamping operation 22 and the workpiece transport control 23 are also carried out via input-output components.

A numerical control having a computer hereinafter CNC 20, is connected to the SPS 19, the CNC 20 being similar to that described in the Journal *Steuerungstechnik* (Control Technology), 3rd Year (1970), No. 8, Pages 254 to 258. The CNC 20 represents a numerical control system to carry out numerical control functions. Via input components and output components, the input keyboard 24 and a precision adjusting path emitter 25, that can be operated by a handwheel, are connected to the CNC 20 as well as the components including adjusting-value means for the adjusting and position scanning of the transfer rails 4 in, for example, three axes. The path emitter 25 is used for transversely moving the adjusted positions of the transfer rails 4 in very small steps. Each of the components, 26 for the horizontal longitudinal transport of the transfer rails, 27 for the transverse transport and 28 for the vertical movement for lifting and lowering has respectively one of the motors 6, 7, 8, with a corresponding motor control 34, a motor-tachogenerator 31 moving synchronously with the motor shaft, possibly a brake unit 32, movement changing gear means 33 as well as a motor-synchronous pulse generator 36.

The adjustment of the movements of the transfer rails 4 takes place via the input keyboard 24 by inputting data identifying the axes 26, 27, 28 to be adjusted via the keys 30, indicating the adjusting quantities (path measurements) therefor as well as the acceleration and speed values therefore introduced via the keys 35. The step-by-step release of the adjusted values for the tool-related programming and for the storage in the SPS 19 can take place thereafter, via the pulse generator 36, the current position value is led back to the CNC and via CNC 20 to the SPS 19. Until the indicated position is reached in the test run, a comparison takes place in the CNC 20 between the desired value located in the CNC 20 and the actual value coming from the pulse generator 36 which, when the values are the same, results in the stoppage of the motor 6, 7, 8 of the respective called axis 26, 27, 28, in the triggering of the brake 32 and in a stop signal.

The speed that is adjusted via the CNC 20 is reduced before the desired position is reached. The reduction in speed may be effected in a manner similar to the operation effected in reaching an indicated position in a test run as described immediately above, as understood by those of ordinary skill in the art, by a storing threshold value representing a position to be arrived at prior to the desired position. The present indicated position as sensed by an actual value input pulse generator, such as 36, is compared with the threshold value. As movement continues, the difference between the threshold value and the indicated position will decrease. When the difference reaches zero, such a signal may be used to reduce the speed, the reduced speed obtaining during the remaining period as the indicated position approaches the desired position.

The current actual values for the axes are shown in a display 37 in the area of the input keyboard 24. For an easy accessibility to the operator, the input keyboard 24 and the display 37 are integrated in the suspended control panel 14.

The data values for the tool automation 21 and the gripper clamping operation 22 are fed as a function of the moving phases of the transfer rails, to the CNC 20 via at least SPS 19, and will then also be controlled by the SPS 19. The point in time of the control can be programmed for each function via the input keyboard 24.

The control of the transport of the workpieces, the transport control 23 for parts of the workpieces, is subdivided into a moving control, non-contact switch or sensor 15 and into a position control non-contact switch or sensor 16. The parts transport, employing program technology, is controlled via the SPS 19. The individual movements in the axes, the dependent sequences of the tool automation 21, of the control 22 of the clamping grippers and of the parts transport control 23 are determined via the program sequence of the SPS 19 at a machine cycle that is closed in itself, can be called at any time and is tool-oriented.

The invention is not limited to the shown embodiment. Instead of the CNC 20, other control means are conceivable for the position control, such as a numerical positioning control that is integrated in the SPS 19 or may also be constructed independently from it. For example, it is possible to integrate in a guiding machine, a motor that causes the transfer movements with a rotating speed that is adapted as a function of the press or the movement of the slide. In this case, a rotation-driven pulse generator is used for the supplying of signals to the axis drives relative to the angular position or the time. The movements of the transfer rails in the axes to be adjusted can then be scanned by an accompanying tachogenerator or via a CNC such as 20.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A multi-stage press simulation arrangement for determining desired values for the transport of a workpiece and related gripper movement and tool automation by using less than all the elements of a multi-stage press comprising:
   transport means separate from said multi-stage press for physically replicating the movement of at least one transport means of said multi-stage press, the transport means including movable transfer rails carrying gripping devices and moving along guide means and at least one driving means for driving said transfer rails through braking means and movement changing means;
   a means for tool automation, a means for gripper control and a means for control of a workpiece transport connected to said transport means; and
   a program control means for controlling the movement of said transport means through said driving means and generating a program to be used on said multi-stage press for the sequence of movement of said transport means with respect to said tool automation means, gripper control means and said transport control means.

2. A simulation arrangement according to claim 1, wherein the program control means comprises
   a positioning control means with workpiece-specific and press-surroundings-specific programming.

3. A simulation arrangement according to claim 1, wherein a program control means comprises
   a computer numerical controller, CNC, programmable with respect to at least a workpiece and responsive to signals received from at least one of an input keyboard and a display unit,
   a stored-programmable control means connected to the CNC and responsive to signals received from at least one of a tool automation means, gripper movement control means and a workpiece transport control means for control of the CNC, of said tool automation means, of said gripper movement control means, of said workpiece transport control means and the control of a drive in at least two axes of workpiece transport wherein, for each of said axis, said simulation arrangement has
   a drive motor unit, a motor control circuit therefor and a value emitter sensing the actual position of said workpiece transport with respect to said axis.

4. A simulation arrangement according to claim 3 comprising, for a programmable sequence of movements,
   input means for transmitting to the CNC signals representing the values for said programmable sequence of movements for the programming for movement on at least one of said axis,
   means for transmitting to said CNC sensed actual position values on said at least one of said axis,
   output means connected to the CNC for receiving output data from said CNC for at least said at least one axis to supply position-related signals to control position movement on said axis, and
   indicating means for the visual reproduction of the current actual values for position assumed on said axis.

5. A simulation arrangement according to claim 3, further comprising
   input means connected to the stored program control means for processing and control of the signals occurring in at least one of an input keyboard, a display unit, a tool automation means, gripper movement control means, a workpiece transport control means, for the control of at least one of the CNC, at least one axis drive of the tool automation of the gripper movement means and of the workpiece transport control means.

6. A simulation arrangement according to claim 3, further comprising a first manually controllable desired-value input means connected to the CNC for generating signals representing identification of at least one individual axis and, a second manually controllable desired-value input means connected to the CNC for generating signals representing minimum and maximum adjusting position data values for at least one of said axes, path measurement and acceleration and speed of movement of said at least one of said axes and a manually operating regulating means for moving the transfer rails on at least one of a number of axes.

7. A simulation arrangement according to claim 6, wherein the first manually-controllable desired-value input comprises a keyboard having a group of keys for input of the individual identification of axes and a group of key for input of the minimum and maximum adjusting position data values, and wherein the CNC comprises output means for supplying desired values to control movement on at least one of said axes, and storage means for the storage of data to be supplied to the press.

8. A simulation arrangement according to claim 1 wherein the means for replicating further comprises a motor with a speed which is comparable to the speed of the press and a pulse generator for generating signals representative of an angle-of-rotation-dependent commands to the driving means.

* * * * *